J. M. Hawley.
Corn Sheller.
N⁰ 85,590.  Patented Jan. 5, 1869.
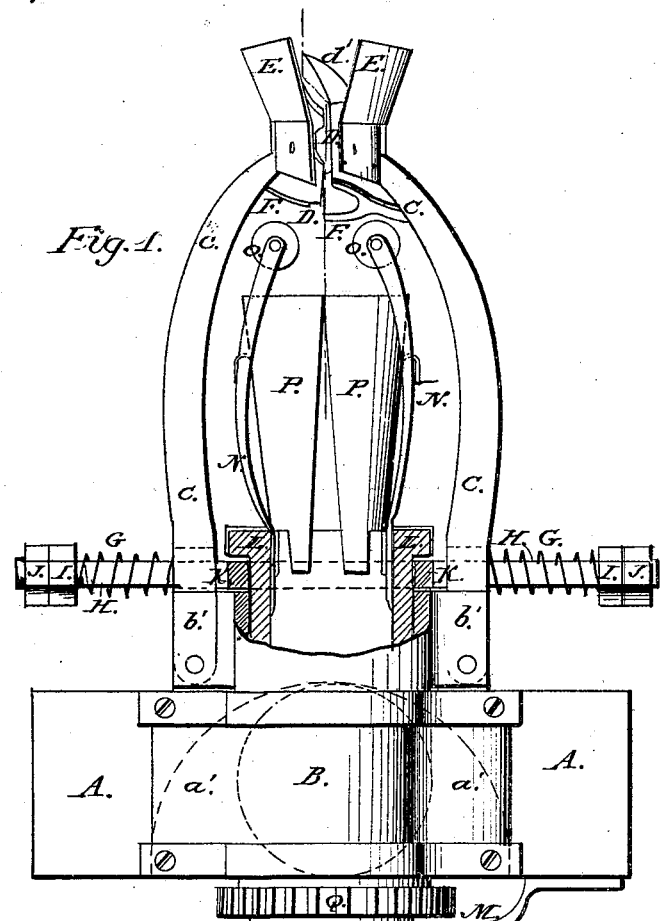
Fig. 1.
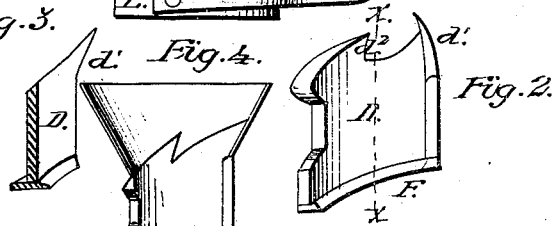
Fig. 3.  Fig. 4.  Fig. 2.
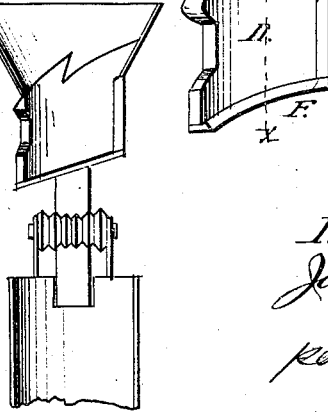
Witnesses:
Wm. A. Morgan
G. C. Cotton,
Inventor:
Jas. M. Hawley
per Munn & Co
Attorney.

JAMES M. HAWLEY, OF HOLTON, INDIANA.

Letters Patent No. 85,590, dated January 5, 1869.

IMPROVEMENT IN CORN-SHELLERS.

The Schedule referred to in these Letters Patent and making part of the same.

*To all whom it may concern:*

Be it known that I, JAMES M. HAWLEY, of Holton, in the county of Ripley, and State of Indiana, have invented a new and useful Improvement in Corn-Shellers; and I do hereby declare that the following is a full, clear, and exact description thereof, which will enable those skilled in the art to make and use the same, reference being had to the accompanying drawings, forming part of this specification.

Figure 1 is a top view of my improved corn-sheller, part being broken away, to show the construction.

Figure 2 is a detail view of one of the jaws.

Figure 3 is a detail sectional view of the same, taken through the line $x\ x$, fig. 2.

Figure 4 represents a vertical longitudinal section of my invention, taken through the line $y\ y$ of fig. 1.

Similar letters of reference indicate corresponding parts.

My invention has for its object to furnish an improved corn-sheller, by means of which the corn may be removed from the cobs rapidly and entirely, whatever may be the size or shape of the ear, and which shall at the same time be simple in construction and easily operated; and It consists in the construction and combination of the various parts, as hereinafter more fully described.

A is a block, in bearings, in which the sleeve or hollow cylinder B revolves, and which is designed to be attached to a bench, or other suitable support.

C are arms, the lower ends of which are pivoted in longitudinal slots or recesses formed in the projections or ears $b'$, formed upon the sides of the forward end of the sleeve or hollow cylinder B.

To the forward ends of the arms C are detachably and securely attached the jaws D.

The jaws D are made curved, as shown in figs. 1, 2, and 3, so as to fit the ear to be shelled, the said curves being less than a semicircle, so that when the jaws are forced towards each other the space between them may be in the form of an oval. This enables the jaws D to operate upon small or large ears with equal facility.

Upon the forward edges of the upper parts of the jaws D are formed cutters, $d^1$, by which the corn is removed from the cob.

$d^2$ are cutters, formed upon the middle parts of the upper edges of the jaws D, and which are designed to operate upon the points of the ears, or upon small ears that would not be operated upon by the cutters $d^1$.

E are flanges, attached to the outer sides of the jaws D, or to the ends of the arms C, and which serve as guides in introducing the ears into the machine.

The inner edges of the jaws D are made inclined, and have inwardly-projecting flanges, F, formed upon or attached to them, which act as threads to draw the ear into the machine.

The arms G are held forward, pressing the jaws D against the ears of corn by the action of the coiled springs G, placed upon the arms H.

The inner ends of the springs G rest against the outer sides of the arms C, and their outer ends rest against the nuts I, screwed upon the outer ends of the arms H, and by means of which the tension of the springs G may be adjusted, as required.

The nuts I are kept from working loose by the jam-nuts J.

The inner ends of the arms H pass through slots in the arms C, and are attached to or formed upon the ring K, which rides upon the hollow journal L, upon which the sleeve or hollow cylinder B revolves, and which is held stationary by the brace-strap M, attached to its inner end, and which rigidly connects it with the block A.

N are springs, the inner ends of which are securely attached to the outer or forward end of the hollow journal L.

The outer ends of the springs N are forked, and have grooved concave rollers, O, pivoted to them, which are pressed against the cob, and prevent the ear from being carried around by the jaws D, and cause it to be drawn inward by the action of the threads or flanges F.

P is a funnel, made in two parts, the inner ends of said parts being attached to the outer end of the hollow journal L, and their outer ends being attached to the outer parts of the springs N.

The funnel P is designed to guide the cobs into the hollow journal L, through which they pass to escape from the machine, and they are made in two parts, to allow any corn that may pass into said funnel with the cobs to escape through the spaces between the said parts.

Q is a gear-wheel, attached to the inner end of the sleeve or hollow cylinder B, and into the teeth of which mesh the teeth of a crank-gear wheel, working upon a fixed journal attached to the block A, to enable the machine to be operated by hand.

If desired, the machine may be driven by a band passed around the sleeve B, through the space or recess $a'$, formed in the block A for that purpose.

The working-parts of the sheller should be enclosed or encased with a box or casing, open upon the lower side, for the escape of the shelled corn, and with a round hole in its forward end, through which the ears of corn are inserted.

By omitting the flanges or threads F, rollers O, springs N, and funnel P, a cheaper and very effective machine may be made, but in this case, when the ear is half shelled it must be withdrawn and the other end inserted, it being necessary for the operator all the time to hold the ear in his hand.

Having thus described my invention,

What I claim as new, and desire to secure by Letters Patent, is—

1. The cutters D, constructed with teeth $d^1$ and $d^2$ upon their upper edges, in combination with the pivoted arms C, substantially as herein shown and described, and for the purpose set forth.

2. The combination of the guide-flanges E, cutters D $d^1$ $d^2$, arms C, springs G, and hollow cylinder or sleeve B with each other and with the journal L, substantially as herein shown and described, and for the purpose set forth.

3. The combination of the inclined flanges or threads F, grooved rollers O, springs N, funnel P, and hollow journal L with the cutters D and hollow cylinder B, substantially as herein shown and described, and for the purpose set forth.

JAMES M. HAWLEY.

Witnesses:
 SQUIRE COX,
 WILLIAM J. ROBINSON.